(12) United States Patent
Hamada

(10) Patent No.: US 6,604,293 B2
(45) Date of Patent: Aug. 12, 2003

(54) SURVEYING INSTRUMENT AND A METHOD FOR DRIVE CONTROL THEREOF

(75) Inventor: Naoaki Hamada, Yokohama (JP)

(73) Assignees: Nikon Geotecs Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 10/106,067

(22) Filed: Mar. 27, 2002

(65) Prior Publication Data

US 2002/0138998 A1 Oct. 3, 2002

(30) Foreign Application Priority Data

Mar. 29, 2001 (JP) ........................................ 2001-095917

(51) Int. Cl.$^7$ ................................................ G01C 5/02
(52) U.S. Cl. ............................ 33/290; 33/1 PT; 33/282
(58) Field of Search ................................. 33/1 PT, 282, 33/284, 290, 291, 292, 1 N, 534

(56) References Cited

U.S. PATENT DOCUMENTS 2,943,529 A * 7/1960 Baker ........................... 33/282
5,887,353 A * 3/1999 Beckingham ................. 33/292
6,354,010 B1 * 3/2002 Shirai ........................... 33/292
6,492,806 B2 * 12/2002 Shirai ......................... 33/1 PT

FOREIGN PATENT DOCUMENTS

JP     A 4-163608     6/1992

* cited by examiner

Primary Examiner—G. Bradley Bennett
(74) Attorney, Agent, or Firm—Oliff & Berridge, PLC

(57) ABSTRACT

A surveying instrument assumes either a high-speed drive control mode for driving a surveying optical system at high speed or a low-speed drive control mode for driving the surveying optical system at low speed. A motor is continuously driven through a PWM control method in the high-speed drive control mode. Then, the low-speed drive control mode is selected to drive the motor so as to allow the motor to alternate acceleration and a virtual stop. As the surveying optical system approaches a predetermined position, a condition for next motor acceleration is set based upon the detected rotational angle of the surveying optical system. Thus, it becomes possible to stop the surveying optical system at the predetermined position with a high degree of accuracy.

14 Claims, 7 Drawing Sheets

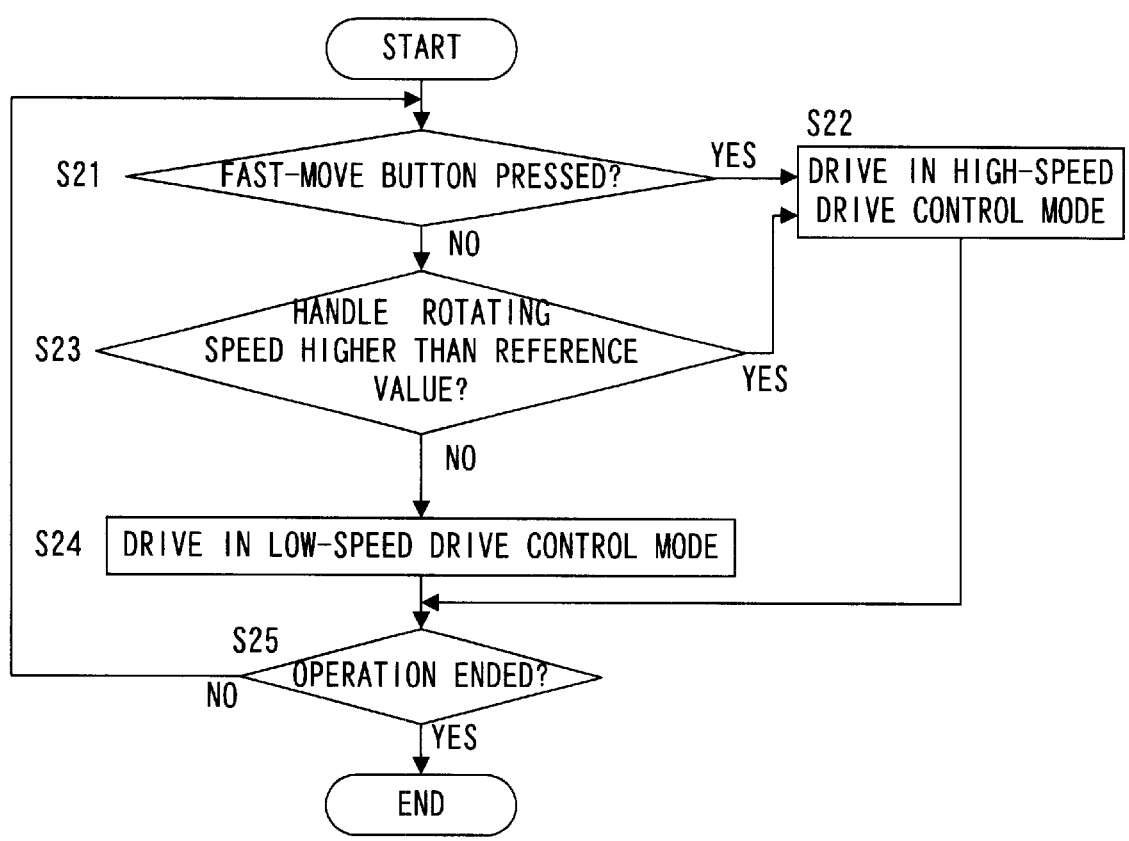

SURVEYING INSTRUMENT AND A METHOD FOR DRIVE CONTROL THEREOF

INCORPORATION BY REFERENCE

The disclosure of the following priority application is herein incorporated by reference:
Japanese Patent Application No. 2001-095917 filed Mar. 29, 2001.

BACKGROUND OF THE INVENTION

1. Field of the Invention

The present invention relates to a surveying instrument and a method for drive control thereof which rotationally drive a surveying optical system to be oriented toward a surveying target with a motor or the like.

2. Description of Related Art

There is a technology for rotationally driving a surveying optical system provided in a surveying instrument with a motor in the known art. For instance, Japanese Laid-Open Patent Publication No. H 4-163608 discloses a technology for controlling the motor rotation based upon a detection output from an encoder provided to detect the rotational angle of the surveying optical system which is caused to rotate by the drive motor.

While high-speed drive must be achieved in the control of the drive executed by a motor in a surveying instrument in order to orient the surveying optical system toward the target promptly, the surveying instrument also must be capable of implementing low-speed drive in order to be able to stop the surveying optical system in accurate alignment with the target. During high-speed drive, the operator enters a rotational angle into the surveying instrument so as to rotate the surveying optical system by, for instance, 10°, and in response, the surveying instrument implements fast rotational drive so as to rotate the surveying optical system by the specified rotational angle value. During low-speed drive, on the other hand, rotational drive is implemented to set the rotational angle of the surveying optical system accurately in, for instance, 1-sec increments. A complex speed reducing mechanism similar to the transmission in an automobile is required in order to achieve drive control over a wide dynamic range from high speed to low speed.

SUMMARY OF THE INVENTION

An object of the present invention is to provide a surveying instrument and a method for drive control thereof capable of driving a surveying optical system with a pulse motor over a wide dynamic range in response to any changes in the speed from high speed to low speed and stopping the surveying optical system when it is oriented toward the surveying target with a high degree of accuracy.

In order to achieve the object described above, a surveying instrument according to the present invention, comprises a surveying optical system to be oriented toward a surveying target, a drive motor that drives said surveying optical system, a first drive control circuit that outputs a first drive signal having a first frequency and a first pulse duty cycle and used to continuously drive said drive motor, a second drive control circuit that outputs a second drive signal having a second frequency and a second pulse duty cycle and used to drive said drive motor so as to allow said drive motor to alternate accelerations and a virtual stop, and a control device that rotationally drives said surveying optical system to set said surveying optical system at a predetermined position by first providing said first drive signal to said drive motor to drive said drive motor and then providing said second drive signal to said drive motor to drive said drive motor.

The surveying instrument may comprise an encoder circuit that outputs a signal corresponding to an extent to which said surveying optical system is driven, a goniometric calculation circuit that performs goniometric calculation by using the signal output by said encoder circuit to determine a rotational angle of said surveying optical system, and an interpolation calculation circuit that performs interpolation calculation of the rotational angle by using the signal output by said encoder circuit to determine a rotational interpolation angle, wherein said second drive control circuit changes at least one of the second pulse duty cycle and the second frequency of said second drive signal based upon the rotational angle and rotational interpolation angle determined by said goniometric calculation circuit and said interpolation calculation circuit. It is preferable that said goniometric calculation circuit and said interpolation calculation circuit perform the goniometric calculation and the interpolation calculation after said second drive control circuit first outputs said second drive signal to said drive motor and said drive motor thus rotationally driven virtually comes to a halt; and said second drive control circuit next outputs said second drive signal which reflects the rotational angle and rotational interpolation angle determined by said goniometric calculation circuit and said interpolation calculation circuit.

It is preferable that the second frequency of said second drive signal is lower than the first frequency of said first drive signal, and a second pulse width based upon the second frequency and the second pulse duty cycle is larger than a first pulse width based upon the first frequency and the first pulse duty cycle. It is desirable that said second drive control circuit sets the second frequency of said second drive signal within a 1 Hz~20 Hz range and also ensures that the second pulse width is within a 10 $\mu$sec~20 msec range.

The surveying instrument may further comprise an encoder circuit that outputs a signal corresponding to an extent to which said surveying optical system is driven, a goniometric calculation circuit that performs goniometric calculation by using the signal output by said encoder circuit to determined a rotational angle of said surveying optical system, and an interpolation calculation circuit that performs an interpolation calculation of the rotational angle by using the signal output by said encoder circuit to determine a rotational interpolation angle, wherein said first drive control circuit changes at least the first pulse duty cycle of said first drive signal based upon the rotational angle determined by said goniometric calculation circuit, and said second drive control circuit changes one of the second pulse duty cycle and the second frequency of said second drive signal based upon the rotational angle and rotational interpolation angle determined by said goniometric calculation circuit and said interpolation calculation circuit.

Said control device may select one of said first drive signal and said second drive signal to be provided to said drive motor in correspondence to the rotational angle calculated by said goniometric calculation circuit.

It is possible that the surveying instrument further comprises a speed detection device that detects a speed with which said surveying optical system is given, wherein said control device provides said first drive signal to said drive motor if the drive speed detected by said speed detection device exceeds a predetermined value and provides said second drive signal to said drive motor if the speed detected by said speed detection device is equal to or lower than the predetermined value.

In order to achieve the object described above, a surveying instrument according to the present invention, comprises a surveying optical system to be oriented toward a surveying target, a drive motor that drives said surveying optical system, a first drive control circuit that implements drive control on said drive motor at a first drive speed by outputting a first drive signal having a first frequency and a first pulse width, a second drive control circuit that implements drive control on said drive motor at a second drive speed lower than the first drive speed by outputting a second drive signal having a second frequency lower than the first frequency and a second pulse width larger than the first pulse width, and a control device that provides one of said first drive signal and said second drive signal to said drive motor. It is possible that the surveying instrument further comprised an encoder circuit that outputs a signal corresponding to an extent to which said surveying optical system is driven, a goniometric calculation circuit that performs goniometric calculation by using the signal output by said encoder circuit to determine a rotational angle of said surveying optical system, and an interpolation calculation circuit that performs interpolation calculation of the rotational angle by using the signal output by said encoder circuit to determine a rotational interpolation angle, wherein said second drive control circuit changes at least one of the second frequency or the second pulse width based upon the rotational angle and rotational interpolation angle determined by said goniometric calculation circuit and said interpolation calculation circuit.

Said second drive signal output by said second drive control circuit before the goniometric calculation and the interpolation calculation are calculated may be a single pulse.

In order to achieve the object described above, a method for drive control of a surveying instrument according to the present invention, outputs a first drive signal so as to continuously drive a drive motor that rotationally drives a surveying optical system and outputting a second drive signal so as to drive the drive motor by allowing the drive motor to alternate accelerations and a virtual stop; and controls a rotational drive of the surveying optical system so as to set the surveying optical system at a predetermined position by first providing the first drive signal to the drive motor and then providing the second drive signal to the drive motor. A method for drive control of a surveying instrument may detect an extent to which the surveying optical system is driven; performs goniometric calculation and interpolation calculation by using the detected values of the extent to which the surveying optical system is driven to determine a rotational angle and rotational interpolation angle of the surveying optical system, after providing the second drive signal containing a single pulse to the drive motor thus rotationally driven; and provides the second drive signal which reflects the rotational angle and rotational interpolation angle determined by performing the goniometric calculation and the interpolation calculation to the drive motor.

In order to achieve the object described above, a surveying instrument according to the present invention comprises a surveying optical system to be oriented toward a surveying target; a drive motor that drives said surveying optical system; an encoder circuit that outputs a signal corresponding to an extent to which said surveying optical system is driven; a goniometric calculation circuit that performs goniometric calculation by using the signal output by said encoder circuit to determine a rotational angle of said surveying optical system; an interpolation calculation circuit that performs interpolation calculation of the rotational angle by using the signal output by said encoder circuit to determine a rotational optical angle; a first drive control circuit that outputs a first drive signal having a first frequency and a first pulse duty cycle and used to continuously drive said drive motor; a second drive control circuit that outputs a second drive signal having a second frequency lower than the first frequency of said first drive signal and a second pulse duty cycle with a second pulse width based upon the second frequency and the second pulse duty cycle, larger than the first pulse width based upon the first frequency and the first pulse duty cycle, so as to drive said drive motor by allowing said drive motor to alternate accelerations and a virtual stop; and a control device that rotationally drives said surveying optical system to set said surveying optical system at a predetermined position by first providing said first drive signal to said drive motor to drive said drive motor and then providing said second drive signal to said drive motor to drive said drive motor, wherein; said second drive control circuit changes at least one of the second pulse duty cycle and the second frequency of said second drive signal based upon the rotational angle and rotational interpolation angle determined by said goniometric calculation circuit and said interpolation calculation circuit.

BRIEF DESCRIPTION OF THE DRAWINGS

FIG. 7 presents a flowchart of the processing and procedure in a switching control program executed to select either the drive control mode for high-speed drive or the control mode for low-speed drive in the CPU of the surveying instrument achieved in the embodiment of the present invention.

DESCRIPTION OF THE PREFERRED EMBODIMENT

The following is an explanation of an embodiment of the present invention, given in reference to the drawings.

Figure 1:
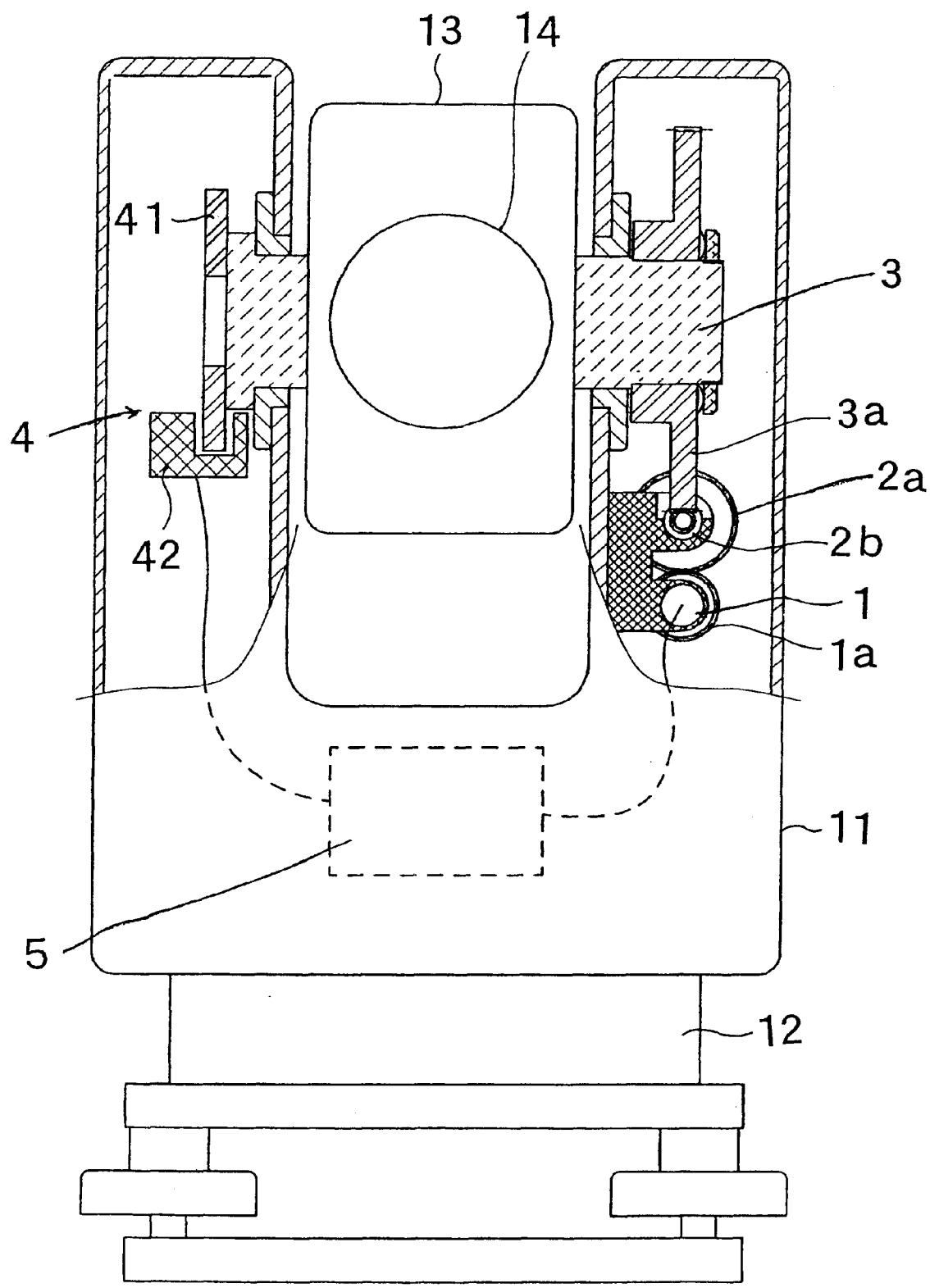
FIG. 1 is a frontal view with a partial cut-away of a surveying instrument achieved in an embodiment of the present invention.

FIG. 1 is a frontal view with a partial cut-away of a surveying instrument having a drive device achieved in an embodiment of the present invention. The surveying instrument in FIG. 1 includes a main body 11 that is supported by a supporting unit 12 so as to be allowed to rotate along the horizontal direction. A telescope unit 13 constituting a surveying optical system oriented toward the surveying target is supported by a horizontal shaft 3. The horizontal shaft 3 is supported by the main body 11 so as to be allowed to rotate along the vertical direction. The telescope unit 13 includes an objective lens 14 provided on one side and an eyepiece lens (not shown) provided on another side. The telescope unit 13 is collimated relative to the target (not shown) by rotating along the horizontal direction and the vertical direction. It is to be noted that the direction extending to the left and right in the drawing represents the horizontal direction and the direction extending upward and downward in the drawing represents the vertical direction.

In the embodiment, the telescope unit 13 is driven rotationally along the vertical direction and the horizontal direction by motors. Drive control is implemented on its rotation along the vertical direction and the horizontal direction by drive devices assuming structures similar to each other. Accordingly, an explanation is given in reference to the embodiment of the present invention by focusing on the vertical drive device, and an explanation of the horizontal drive device is omitted.

As shown in FIG. 1, a horizontal drive motor 1, a gear 1a provided at an output shaft of the motor 1, a gear 2a, a worm gear 2b and a worm wheel 3a which rotates the horizontal shaft 3 are provided inside the main body 11. The rotation of the motor 1, slowed down by the gears 1a and 2a, the worm gear 2b and the worm wheel 3a, is transmitted to the horizontal shaft 3. As the horizontal shaft 3 rotates, the telescope unit 13 is rotationally driven along the vertical direction around the horizontal shaft 3. An encoder 4 is provided at the horizontal shaft 3.

Figure 2:
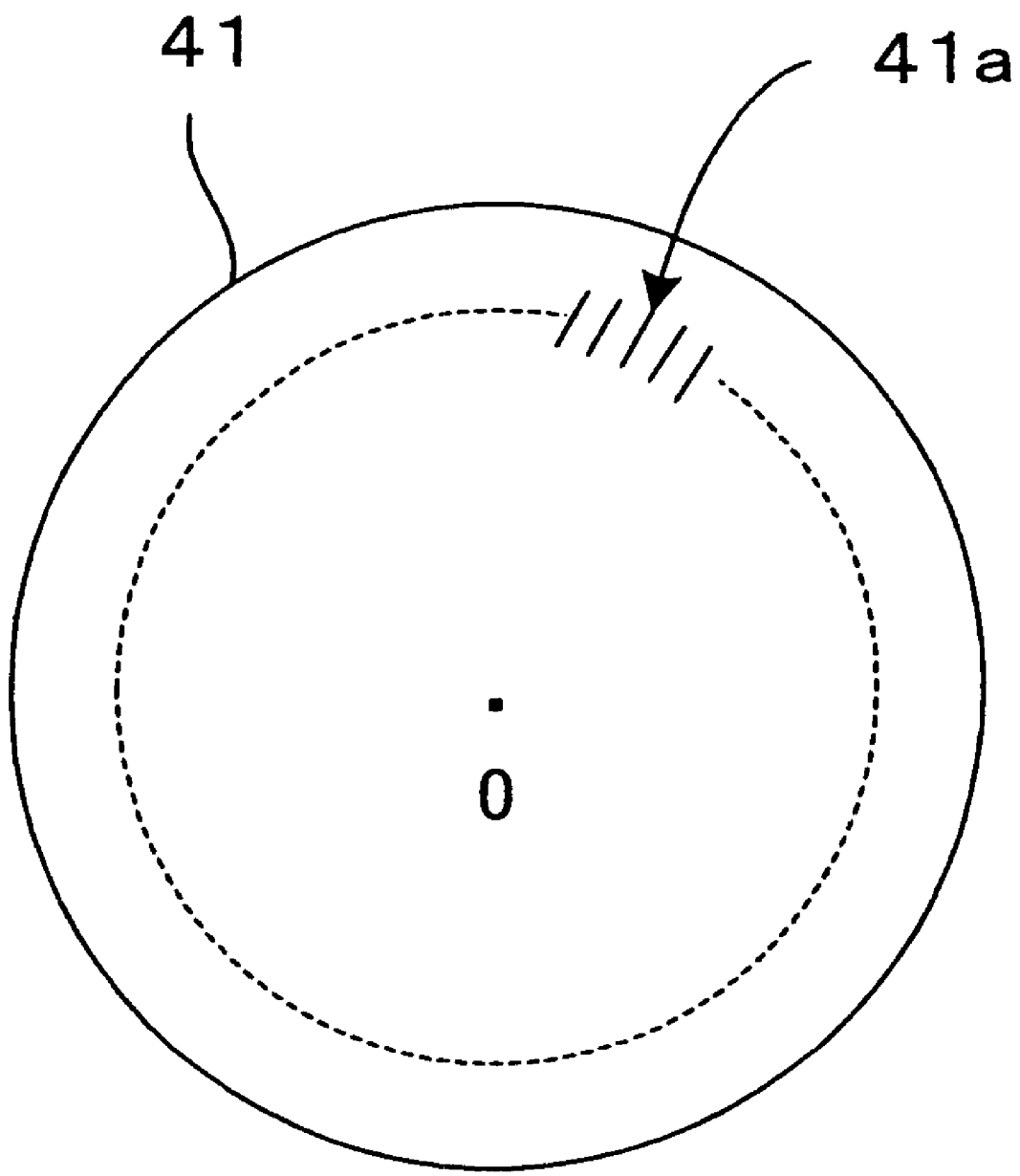
FIG. 2 shows the disk of the encoder in FIG. 1.

The encoder 4 is constituted of a disk 41 and a photointerrupter 42. FIG. 2 shows the disk 41 of the encoder 4. The center 0 of the disk 41 in FIG. 2 matches the rotational center of the horizontal shaft 3 in FIG. 1. A plurality of slits 41a are formed along the external circumference of the disk 41. The number of slits 41a may be, for instance, 16,200. Thus, the interval between the individual slits is equivalent to a 360°/16200=80 sec angle.

The photointerrupter 42 in FIG. 1 includes a light emitting element and a light-receiving element (not shown), with the slits 41a of the disk 41 set between the light emitting element and the light-receiving element. Light emitted by the light emitting element of the photointerrupter 42 is irradiated on a slit 41a of the disk 41, and the light, having been transmitted through the slit 41a, is received at the light-receiving element of the photointerrupter 42. The light-receiving element outputs a detection signal indicating the intensity of the received light. As the horizontal shaft 3 rotates causing the disk 41 to rotate, the light received at the light-receiving element alternately indicates high intensity and low intensity since it is alternately transmitted through a slit 41a and blocked over the area between slits.

A control circuit unit 5 implements drive control on the motor 1 by detecting the rotational angle of the horizontal shaft 3, i.e., the rotational angle of the telescope unit 13, based upon the detection signal output by the light-receiving element in correspondence to the light alternately achieving high-intensity and low intensity. For instance, if the detection signal alternately indicates a high intensity and low intensity twice, the rotational angle of the telescope unit 13 is 160 seconds. In addition, the control circuit unit 5 detects the rotating speed of the horizontal shaft 3 (the telescope unit 13) based upon the detection signal.

The telescope unit 13 may be driven through either of the following two methods in the surveying instrument explained above.

(1) The operator specifies a rotational angle for the telescope unit 13 through an operation panel (not shown). The control circuit unit 5 implements drive control on the motor 1 so as to rotationally drive the telescope unit 13 according to the specified angle.

(2) The operator operates a switch (an operation member) through the operation panel (not shown). The control circuit unit 5 implements drive control on the motor 1 in conformance to the extent to which the operation member is operated.

In method (1), the control circuit unit 5 implements high-speed drive control so as to rotate the telescope unit 13 at high speed when the specified angle is large and then implements low-speed drive control so as to stop the telescope unit 13 at the predetermined angle with a high degree of accuracy as the position of the telescope unit 13 approaches the instructed rotational angle position. In method (2), the control circuit unit 5 implements high-speed drive control so as to rotate the telescope unit 13 at high speed if the switch has been operated to a large extent and implements low-speed drive control so as to slowly rotate the telescope unit 13 if the switch has been operated to a small extent.

The present invention is characterized in that the drive control mode set for controlling the drive of the telescope unit 13 includes a drive control mode for high-speed drive and a control mode for low-speed drive.

Figure 3:
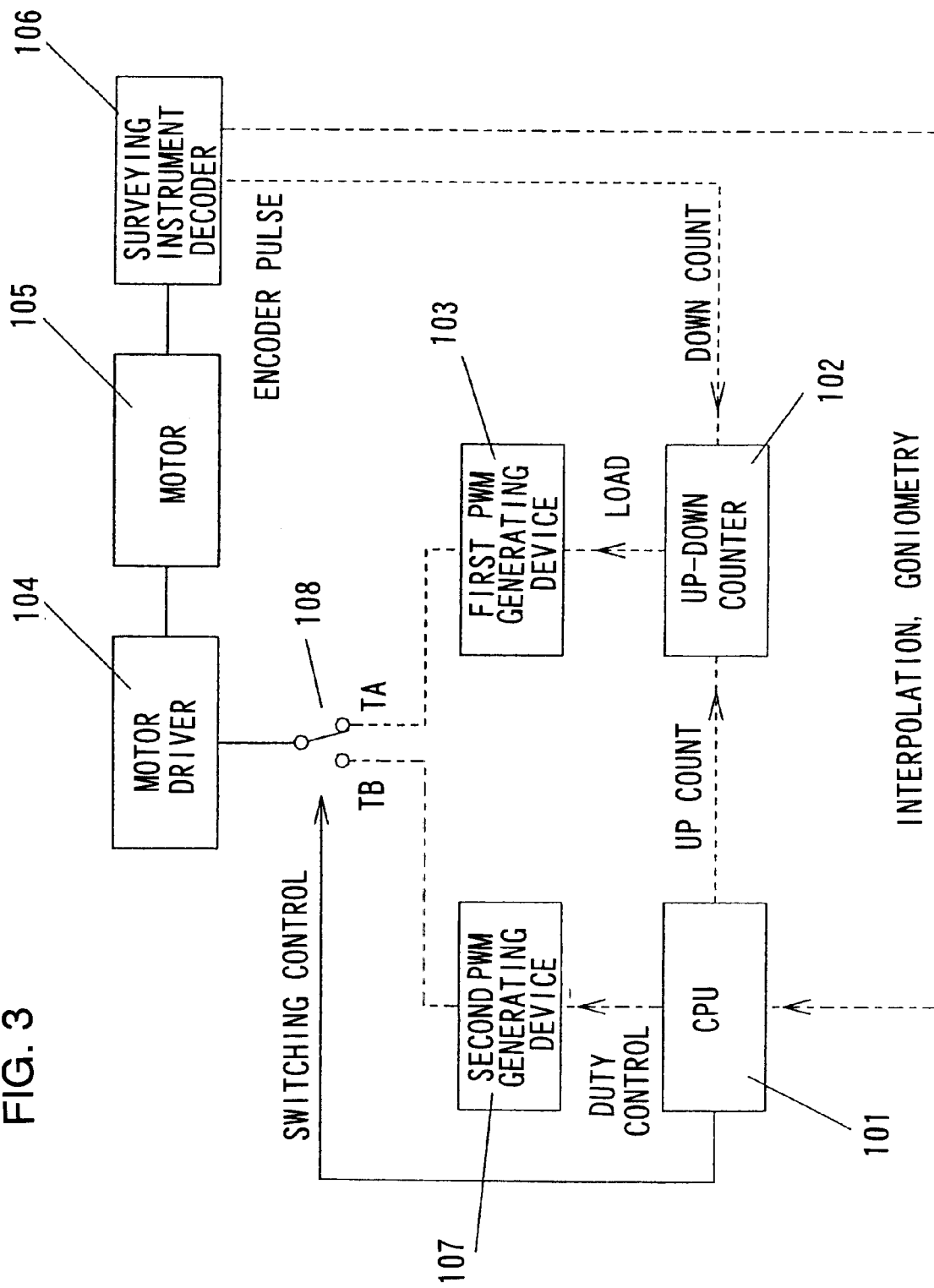
FIG. 3 is a block diagram presenting an example of the drive control circuit that may be used in the surveying instrument in the embodiment of the present invention.

The following is a detailed explanation of the drive control implemented on the motor 1. FIG. 3 presents a block diagram of an example of the structure that may be assumed in a drive control circuit. In FIG. 3, a drive control block includes a CPU 101, an up/down counter 102, a first PWM generating device 103, a motor driver 104, a motor 105, a surveying instrument encoder 106, a second PWM generating device 107 and a switch 108. The motor 105 is equivalent to the motor 1 in FIG. 1, whereas the surveying instrument encoder 106 is equivalent to the encoder 4 in FIG. 1. The CPU 101, the up/down counter 102, the first PWM generating device 103, the motor driver 104, the second PWM generating device 107 and the switch 108 are included in the control circuit unit 5 shown in FIG. 1.

High Speed Drive Control Mode

As the CPU 101 outputs a switching control signal to the switch 108 and the switch 108 is switched to the TA side in response, a high-speed drive control loop is formed. The high-speed drive control loop is constituted of the CPU 101, the up/down counter 102, the first PWM generating device 103, the motor driver 104, the motor 105 and the surveying instrument encoder 106. It is to be noted that the flow of the control signal used in the high-speed drive control mode is indicated by the dotted line and the flow of the control signal used in the low-speed drive control mode to be detailed later is indicated by the one-dot chain line in FIG. 3. In addition, the flow of the control signal used in both the high-speed drive control mode and the low-speed drive control mode is indicated by the solid line.

The CPU 101 generates a pulse signal and provides the pulse signal to the up/down counter 102. The up/down counter 102 performs a count up by using the pulse signal from the CPU 101 as a count-up pulse. The first PWM generating device 103 reads the count value at the up/down counter 102 over predetermined intervals and generates a PWM pulse by changing the duty cycle in conformance to the count value. The frequency f1 of the PWM pulse generated by the first PWM generating device 103 maybe, for instance, 10 KHz. The first PWM generating device 103 raises the duty cycle d1 of the PWM pulse as the count value reading indicates a higher value and lowers the duty cycle d1 of the PWM pulse as the count value reading becomes lower. When the duty cycle d1 is raised, the pulse width increases, whereas when the duty cycle d1 is lowered, the pulse width is reduced.

The motor driver 104 generates a pulse drive voltage to be supplied to the motor 105 in conformance to the waveform of the PWM pulse output from the first PWM generating device 103. The frequency and the duty cycle of the drive voltage pulse supplied to the motor 105 are equal to the frequency f1 and the duty cycle d1 respectively of the PWM pulse output from the first PWM generating device 103. It is to be noted that the frequency f1 should be a-few-tenth percent of the electrical time constant of the motor 105, so as to minimize the inconsistency in the rotating speed of the motor 105 attributable to on/off of the drive voltage pulse supplied to the motor 105.

The drive voltage pulse supplied to the motor 105 causes the motor 105 to start rotating. In response, the horizontal shaft 3 in FIG. 1 rotates and a detection signal is output from the surveying instrument encoder 106. The detection signal output from the surveying instrument encoder 106 is provided to the up/down counter 102. The up/down counter 102 performs a count-down by using the detection signal from the surveying instrument encoder 106 for a count-down pulse. In other words, it performs a count-down of the number of times that the detection signal alternately indicates high intensity and low intensity. As a result, the rotating speed of the motor 105 is stabilized at a level at which the pulse signal (count-up pulse) output by the CPU 101 and the detection signal (count down pulse) output by the surveying instrument encoder 106 are in balance. By adjusting the speed of the count-up pulse output by the CPU 101, the rotating speed of the motor 105 can be controlled. As the duty cycle of the drive voltage pulse increases, the rotating speed of the motor 105 rises, whereas as the duty cycle of the drive voltage pulse is reduced, the rotating speed of the motor 105 becomes lowered.

It is to be noted that the detection signal output by the surveying instrument encoder 106 is also provided to the CPU 101. The CPU 101 detects the rotating speed of the horizontal shaft 3 by counting the number of times that the detection signal from the surveying instrument encoder 106 alternately indicates high intensity and low intensity within a unit time length.

Low-Speed Drive Control Mode

As the CPU 101 outputs a switching control signal to the switch 108 and the switch 108 is switched to the TB side in response, a low-speed drive control loop is formed. The low-speed drive control loop is constituted of the CPU 101, the second PWM generating device 107, the motor driver 104, the motor 105 and the surveying instrument encoder 106.

The CPU 101 outputs a PWM control signal to the second PWM generating device 107. The second PWM generating device 107 generates a PWM pulse in conformance to the PWM control signal. The frequency f2 and the duty cycle d2 of the PWM pulse generated by the second PWM generating device 107 may be, for instance, 3 Hz and 0.3% respectively. The motor driver 104 generates a pulse drive voltage to be supplied to the motor 105 in conformance to the waveform of the PWM pulse output from the second PWM generating device 107. The frequency and the duty cycle of the drive voltage pulse supplied to the motor 105 are equal to the frequency f2 and the duty cycle d2 respectively of the PWM pulse generated by the second PWM generating device 107.

When the frequency f2 is 3 Hz and the duty cycle d2 is 0.3%, the length of time over which the voltage is applied to the motor 105 per cycle of the drive voltage pulse is $(1/f2) \times d2 = (1/3) \times 0.003 = 1$ msec. In other words, a drive voltage pulse having a pulse width of 1 msec is applied to the motor 105 three times per second. This causes the motor 105 to engage in a repetitive rotating operation in which as soon as it starts to move, the voltage application is cut off, lowering the rotating speed. Namely, the telescope unit 13 (see FIG. 1) of the surveying instrument moves slowly and slightly by repeating a start/stop movement. Since the angle over which the motor 105 is caused to rotate by a single application of the drive voltage pulse to the motor 105 is small enough, the telescope unit 13 appears to the operator of the surveying instrument to be undergoing a slow and steady rotating motion. Since the duty cycle of the PWM pulse is set equal to or lower than 1% in the low-speed drive control mode, a reduction in the power consumption is achieved.

It is difficult to achieve consistency in the rotational angle to which the telescope unit 13 is caused to rotate in response to a single application of the drive voltage pulse to the motor 105, due to such factors as decentering of the speed reducing gear 2 or the like in FIG. 1, the machining accuracy of the horizontal shaft 3 and the like. Accordingly, the CPU 101 calculates the rotational angle of the telescope unit 13 through a goniometric calculation to be detailed later, and outputs a PWM control signal to the second PWM generating device 107 based upon the results of the calculation so as to change either the duty cycle d2 or the frequency f2 or both the duty cycle d2 and frequency f2. As a result, the extent of inconsistency in the rotational angle of the telescope unit 13 corresponding to the unit drive voltage pulse supplied to the motor 105 is minimized. It is to be noted that the pulse width increases as the frequency f2 is lowered, and the pulse width is reduced as the frequency f2 is raised. In addition, the pulse width increases as the duty cycle d2 is raised, and the pulse width is reduced as the duty cycle d2 is lowered.

Next, the goniometric calculation is explained. The CPU 101 detects the rotational angle of the telescope unit 13 by counting the number of times that the detection signal output by the surveying instrument encoder 106 has alternately indicated high intensity and low intensity. As mentioned earlier, the intervals between the slits 41a provided at the disk 41 constituting the encoder each corresponds to 80 seconds. The CPU 101 counts the detection signal output from the surveying instrument encoder 106 as a count pulse, following the start of the drive control of the motor 105. The CPU 101 then determines the angle over which the telescope unit 13 has rotated following the drive start by multiplying the pulse count N by 80 sec. The resolution of the rotational angle determined in this method is 80 seconds. It is to be noted that such a goniometric calculation is always executed when driving the motor 105 whether the control is implemented in the high-speed drive control mode or the low-speed drive control mode. An angle detection may be achieve at a resolution of 80 seconds or less, while the low-speed drive control is implemented, through the goniometric interpolation calculation including the interpolation calculation to be explained below.

Figure 4:
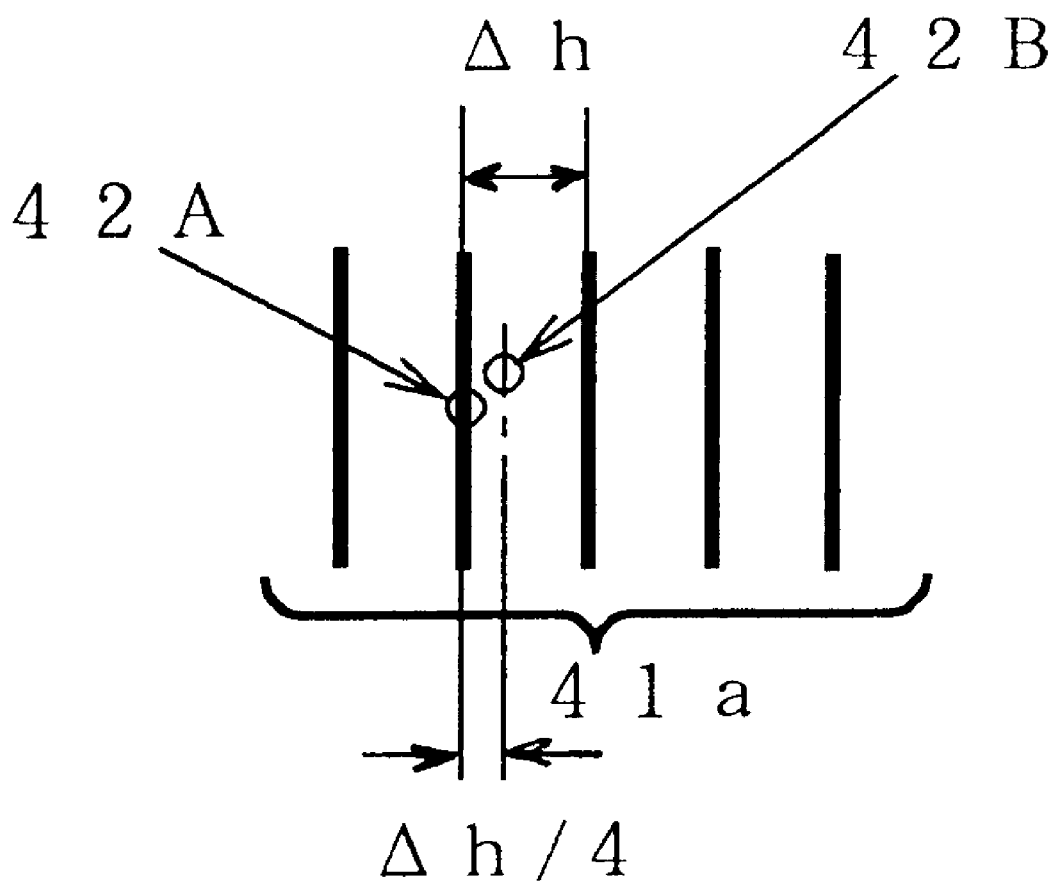
FIG. 4 illustrates the positional relationship between the slits and the light-receiving elements.

The photointerrupter 42, which includes a pair of light receiving elements 42A and 42B, outputs two detection signals with their phases offset by 90° from each other. FIG. 4 illustrates the positional relationship between the slits 41a and the light receiving elements 42A and 42B. In FIG. 4, the intervals between the individual slits 41a are adjusted to Δh and the distance between the light receiving portions of the light receiving element 42A and the light-receiving element 42B is adjusted to Δh/4. Light passing through a slit 41a as the slit 41a passes over the light-receiving element 42A is received by the light-receiving element 42A with the highest level of intensity. With the slit 41a moving from the left to the right in FIG. 4 as the disk 41 rotates, the slit 41a passes over the light-receiving element 42B when the slit 41a has moved to the right by Δh/4. At this time, the light passing through the slit 41a is received by the light-receiving element 42B with the highest level of intensity. Thus, the light-receiving element 42B outputs a light detection signal with its phase retarded by 360°/4=90° relative to the phase of the light detection signal output by the light-receiving element 42A.

Figure 5:
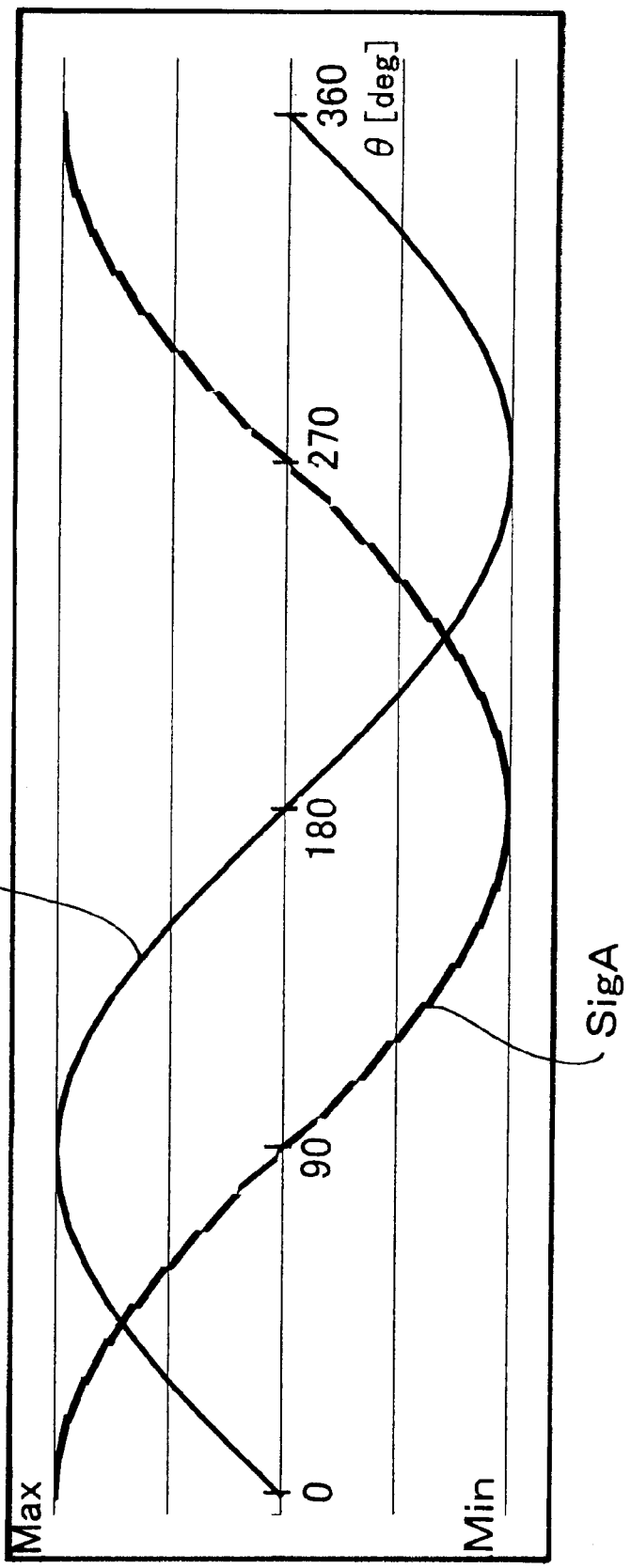
FIG. 5 shows the waveforms of the detection signals output by the light-receiving elements.

FIG. 5 shows the signal waveforms of the detection signal sigA output by the light-receiving element 42A and the detection signal sigB output by the light-receiving element 42B. In FIG. 5, the horizontal axis represents the angle θ and the vertical axis represents the intensity level of the received light. The interval Δh (80 seconds) between the individual slits 41a corresponds to 360° along the horizontal axis representing the angle θ. When the detection signal sigB is expressed as sin θ, the detection signal sigA is expressed as cos θ.

With the two detection signals sigA and sigB with their phases offset from each other by 90° input from the surveying instrument encoder 106, the CPU 101 in FIG. 3 calculates θ based upon the values indicated by the two detection signals. The detection signals sigB and sigA are each a voltage signal with a maximum value of 3.0V and a minimum value of 2.0V, for instance. The CPU 101 eliminates the DC component (2.5V in this case) by individually digitizing the detection signals sigA and sigB input thereto at an internal A/D conversion circuit. As a result, the values of the two signals with the DC components eliminated are expressed as sin θ and cos θ represented by (expression 1) and (expression 2) below.

$$\cos\theta = \text{sigA} - \text{Voffset} \quad \text{(expression 1)}$$

$$\sin\theta = \text{sigB} - \text{Voffset} \quad \text{(expression 2)}$$

with Voffset representing the DC component contained in the detection signals sigB and sigA, which is 2.5V in this case.

The CPU 101 then calculates θ through the formula presented in (expression 3) below based upon (expression 1) and (expression 2).

$$\theta = \tan^{-1}(\sin\theta/\cos\theta) \quad \text{(expression 3)}$$

If θ calculated through (expression 3) is 90°, the rotational angle of the telescope unit 13 corresponds to 20 seconds, are as if θ=180°, the rotational angle of the telescope unit 13 corresponds to 40 seconds. In other words, the rotational angle of the telescope unit 13 corresponding to θ=1° is 80/360=0.222 sec.

Based upon the pulse count N and the value θ (a rotational interpolation angle) calculated through the interpolation calculation, the CPU 101 calculates the rotational angle RA of the telescope unit 13 through the goniometric calculation using the formula in (expression 4) below. It is to be noted that the pulse count N may be obtained by using either the detection signal output by the light-receiving element 42A or the detection signal output by the light-receiving element 42B.

$$RA = 80 \times N + \theta \times 80/360 \quad \text{(expression 4)}$$

The unit of the rotational angle RA calculated through (expression 4) is seconds.

The goniometric interpolation calculation executed by using (expression 1)–(expression 4) takes a certain length of time. As explained earlier, the frequency f2 and the duty cycle d2 of the PWM pulse generated by the second PWM generating device 107 in the low-speed drive control mode are respectively 3 Hz and 0.3%. In such a case, a voltage application to the motor 105 over 1 msec is followed by a 332 msec-period over which no voltage is applied to the motor 105. Since the goniometric interpolation calculation can be completed within an approximately 50 msec period at the most under normal circumstances, the goniometric interpolation calculation performed by using (expression 1)–(expression 4) can be completed before the next application of the drive voltage pulse to the motor 105.

Once the goniometric interpolation calculation of the rotational angle RA is completed, the CPU 101 outputs a PWM control signal based upon the results of the calculation so as to change the duty cycle d2 and the frequency f2 of the PWM pulse output by the second PWM generating device 107. As a result, the rotational angle to be achieved by the telescope unit 13 when it is driven in response to the next application of the voltage pulse to the motor 105 is controlled to a predetermined value. For instance, the control is implemented to achieve a rotational angle of 0.3 sec for the telescope unit 13 when the voltage pulse is applied to the motor 105 over a period of 1 msec.

Figure 6:
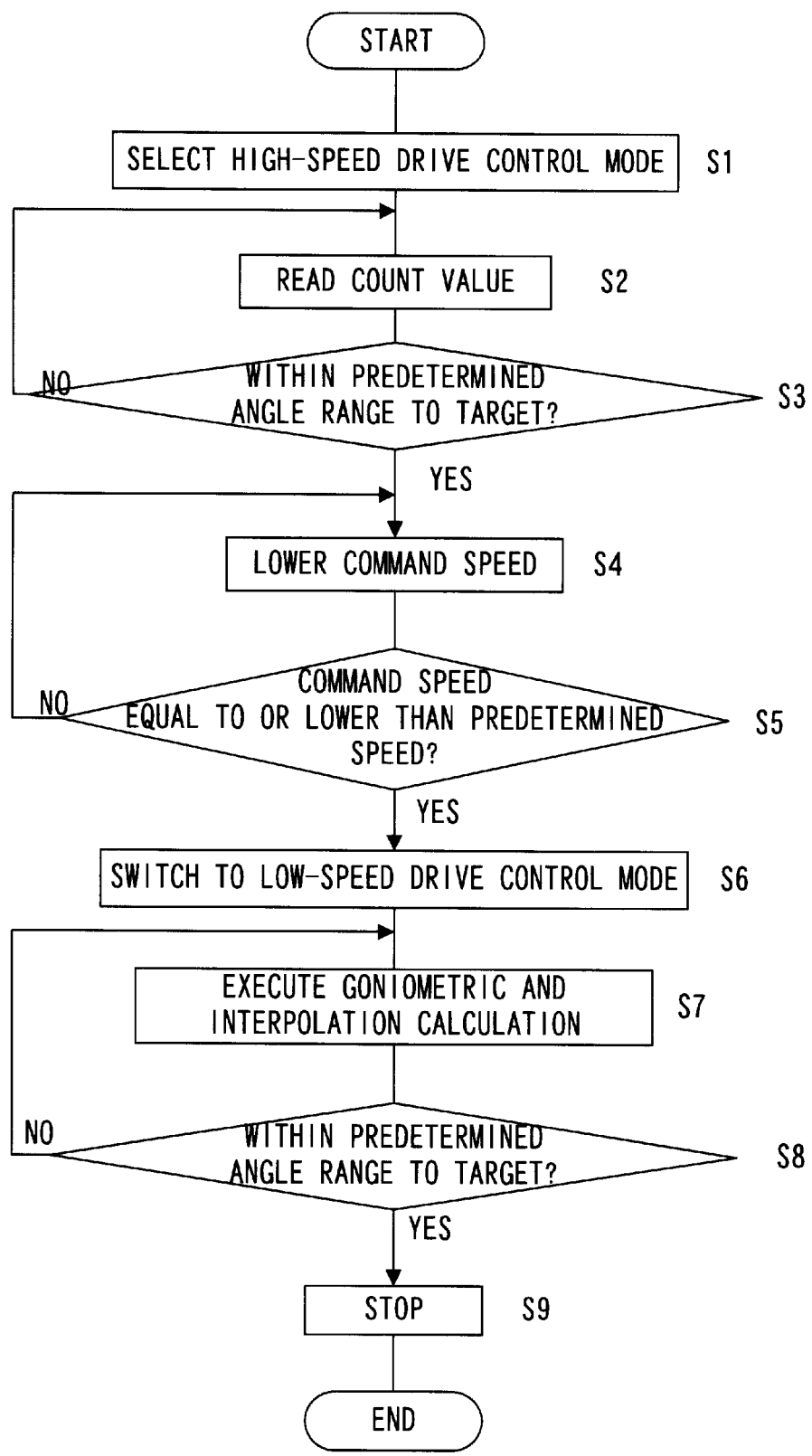
FIG. 6 presents a flowchart of the processing procedure in a switching control program executed to select either a drive control mode for high-speed drive or a control mode for low-speed drive in the CPU of the surveying instrument achieved in the embodiment of the present invention.

FIG. 6 presents a flowchart of the processing procedure in the control implemented to switch between the high-speed drive control mode and the low-speed drive control mode by the CPU 101 in the embodiment of the present invention. The processing in FIG. 6 is started up as the operator of the surveying instrument operates the switch through the operation panel (not shown) and enters an angle (a target angle) over which the telescope unit 13 is to be driven.

In step S1, the high-speed drive control mode in which the first PWM generating device 103 is utilized is selected and the drive of the motor 105 is started accordingly before the operation proceeds to step S2. Instep S2, the pulse count N is read and then the operation proceeds to step S3. In step S3, the angle over which the telescope unit 13 has been driven is calculated by multiplying N by 80 and it is judged as to whether or not the calculated angle is within a predetermined angle range relative to the target angle. The predetermined angle range in this case may be, for instance, 1°. If the drive angle to which the telescope unit 13 has been driven is within 1° of the target angle, an affirmative judgement is made in step S3 and the operation proceeds to step S4, whereas if the drive angle is off the target angle by more than 1°, a negative judgement is made in step S3 and the operation returns to step S2. If the operation returns to step S2, the motor 105 is continuously driven without lowering the drive speed, as explained later.

In step S4, the CPU 101 reduces the command speed, i.e., the rotating speed of the horizontal shaft 3, by lowering the speed of the count-up pulse it outputs. It is to be noted that by lowering the speed of the count-up pulse, i.e., lowering the count value output from the CPU 101, the duty cycle d1 of the PWM pulse is reduced so that the rotation speed of the drive motor 1 becomes lowered. Then, the operation proceeds to step S5. In step S5, the CPU 101 judged as to whether or not the command speed is equal to or lower than a predetermined speed. The predetermined speed may be, for instance, the speed with which the horizontal shaft 3 rotates when the motor 105 is driven with the duty cycle d1 set to 10%. The CPU 101 detects the rotating speed of the horizontal shaft 3 in correspondence to the pulse count value per unit time. If the rotating speed is equal to or lower than the predetermined speed, an affirmative judgement is made in step S5 and the operation proceeds to step S6, whereas if the rotating speed exceeds the predetermined speed, a negative judgement is made in step S5 and the operation returns to step S4. When the operation returns to step S4, the drive speed is further reduced.

In step S6, the CPU 101 switches to the low-speed drive control mode in which the second PWM generating device 107 is utilized before the operation proceeds to step S7. In step S7, the CPU 101 calculates the rotational angle RA of the telescope unit 13 through performing the goniometric interpolation calculation using (expression 1)–(expression 4) before the operation proceeds to step S8. In step S8, it is judged as to whether or not the calculated angle RA is within a predetermined angle range relative to the target angle. The predetermined angle range in this case may be, for instance, 1 second. The CPU 101 makes an affirmative judgement in step S8 if the calculated angle RA is within 1 second relative to the target angle and the operation proceeds to step S9 in such a case, whereas it makes a negative judgement in step S8 if it is off the target angle by more than 1 second, and the operation returns to step S7. If the operation returns to step S7, the motor 105 is driven further.

In step S9, the CPU 101 stops the drive of the motor 105 by stopping the output of the PWM pulse from the second PWM generating device 107, and then the processing in FIG. 6 ends.

FIG. 7 presents a flowchart of the processing procedure of the control implemented to switch between the high-speed drive control mode and the low-speed drive control mode by the CPU 101 when the operator operates an operation member (a drive switch) through the operation panel (not shown) to drive the motor 105 in correspondence to the extent to which the operation member is operated. The processing in FIG. 7 is started up as the operator of the surveying instrument operates the operation member for the telescope unit 13. The operation member is constituted of a handle (not shown) and a fast-move button (quick-move button) (not shown). It is to be noted that the speed with which the handle is operated by the operator is detected and input to the CPU 101.

In step S21 in FIG. 7, the CPU 101 judges as to whether or not the fast-move button has been pressed. If the fast-move button has been operated, an affirmative judgement is made in step S21 and the operation proceeds to step S22, whereas if the fast-move button has not been operated, a negative judgement is made in step S21 and the operation proceeds to step S23. In step S22, the CPU 101 drives the motor 105 in the high-speed drive control mode and the operation proceeds to step S25.

In step S23, the CPU 101 judges as to whether or not the speed with which the handle has been rotated by the operator exceeds a predetermined reference value. If the handle rotating speed exceeds the reference value, an affirmative judgement is made in step S23 and the operation proceeds to step S22, whereas if the handle rotating speed is equal to or lower than the reference value, a negative judgement is made in step S23 and the operation proceeds to step S24.

In step S24, the CPU 101 drives the motor 105 in the low-speed drive control mode and then the operation proceeds to step S25. In step S25, the CPU 101 judges as to whether or not the handle operation has been completed. If the handle operation is still in progress, a negative judgement is made in step S25 and the operation returns to step S21, whereas if the handle operation has been completed, an affirmative judgement is made in step S25 to stop the drive of the motor 105 thereby ending the processing in FIG. 7.

The following advantages are achieved in the embodiment of the present invention explained above.

(1) Either the high-speed drive control mode or the low-speed drive control mode can be selected to generate a drive voltage pulse to be applied to the motor 105 and, as a result, fast rotational drive is achieved in the high-speed drive control mode until the rotational angle of the telescope unit 13 reaches the target angle. In addition, when the low-speed drive control mode is selected, the rotational angle of the telescope unit 13 which is moved slowly and slightly in 0.3-sec increments can be adjusted with a high degree of accuracy.

(2) Since the drive voltage pulse with the high frequency f1 set, for instance, to 10 KHz is applied to the motor 105 to drive the motor 105 in the high-speed drive control mode, the extent of inconsistency in the rotating speed of the motor 105 attributable to on/off of the voltage application is minimized.

(3) Since the drive voltage pulse with the frequency f2 set to 3 Hz and the duty cycle d2 set to 0.3% is applied to the motor 105 to drive the motor 105 in the low-speed drive control mode, a 1 msec-period of voltage application to the motor 105 is followed by a 332 msec period over which no voltage is applied. As a result, the motor 105 is allowed to make a slow movement whereby its rotating speed is lowered as soon as it starts to move.

(4) When the duty cycle d1 is reduced to lower the rotating speed of the motor 105 in the high-speed drive control mode, the pulse width of the drive voltage pulse supplied to the motor 105 becomes extremely small. When the frequency f1 is 10 KHz and the duty cycle d1 is 0.3%, for instance, the drive pulse width is 300 nsec. In such a case, the motor 105 may be overcome by the rotational resistance and thus may not move at all. However, since the drive pulse width is 1 msec when the duty cycle d2 is 0.3% (and the frequency f2 is 3 Hz) in the low-speed drive control mode explained above, the motor 105 can be driven with a high degree of reliability.

(5) The rotational angle of the telescope unit 13 is detected with a higher degree of accuracy than the level of the resolution (80 seconds) of the encoder 4 through the goniometric interpolation calculation which includes the interpolation calculation. The goniometric interpolation calculation is completed while no drive voltage pulse is applied to the motor 105 in the low-speed drive control mode. Since the frequency f2 and the duty cycle d2 of the drive voltage pulse supplied to the motor 105 subsequently are changed based upon the results of the goniometric interpolation calculation, the angle over which the telescope unit 13 rotates per unit voltage pulse is controlled to a specific value, e.g., 0.3 sec.

(6) The control is switched from the high-speed drive control mode to the low-speed drive control mode when the rotating speed of the horizontal shaft 3 becomes equal to or lower than the predetermined speed (if an affirmative judgement is made in step S5) and, as a result, the control can be automatically switched to the low-speed drive control mode when the telescope unit 13 is to be rotationally driven at low speed. This achieves an improvement in the operability of the surveying instrument.

(7) Since the drive is switched from the low-speed drive control mode to the high-speed drive control mode when the speed with which the operator rotates the handle through a handle operation exceeds the reference value (if an affirmative judgement is made in step S23) as well as when the fast-move button has been operated, it is possible to automatically switch to the high-speed drive control mode to rotationally drive the telescope unit 13 at high speed. Thus, the operability of the surveying instrument improves.

In the explanation given above, the duty cycle d2 and the frequency f2 of the PWM control signal output from the second PWM generating device 107 are changed by the CPU 101 in correspondence to the results of the goniometric calculation in the low-speed drive control mode so as to achieve control whereby the rotational angle of the telescope unit 13, which is driven each time the voltage pulse is applied to the motor 105 is sustained at a constant value. This allows the slow movement to be made at a steady speed. Instead, the duty cycle d2 and the frequency f2 may be changed based upon the results of the goniometric interpolation calculation so as to vary the rotational angle of the telescope unit 13 which is driven each time the voltage pulse is applied to the motor 105. In such a case, the speed of the slow movement can be varied.

While the control is switched between the drive control mode for the high-speed drive and the control mode for the low-speed drive by the CPU 101, a mode selection may be implemented by employing a logic circuit, instead.

An explanation has been given above on an example in which the speed control is achieved by varying the duty cycle d1 of the PWM pulse generated by the first PWM generating device 103 while fixing the frequency f1 at 10 KHZ. Instead of fixing the frequency f1 at a constant value, the frequency f1 may be allowed to vary over a range in which the value of the frequency f1 remains a-few-tenth percent of the electrical time constant of the motor 1 mentioned earlier.

An explanation has been given above on an example in which the frequency f2 and the duty cycle d2 of the PWM pulse generated by the second PWM generating device 107 are respectively 3 Hz and 0.3%. However, the frequency f2 may vary within a 1~20 Hz range (1 Hz≦f2≦20 Hz) and the value of the duty cycle d2 may vary within a 0.1~1% range. In correspondence, the PWM pulse width w2 assumes a value within a 100 $\mu$sec~10 msec range (100 $\mu$sec≦w2≦10 msec).

In step S23 explained earlier, it is judged as to whether or not the speed with which the operator rotates the handle exceeds the reference value and the control is switched between the high-speed drive control mode and the low-speed drive control mode based upon the results of the decision. Instead, either mode may be selected based upon whether or not the rotating speed of the horizontal shaft 3 exceeds a predetermined speed. The predetermined speed in this case may be, for instance, the speed with which the horizontal shaft 3 rotates when the motor 105 is driven at a duty cycle of 10%. In this case, as the duty cycle d2 is increased in the low-speed drive control mode, the rotating speed of the motor 105 rises and, as a result, the rotating speed of the horizontal shaft 3 exceeds the predetermined speed and the operation proceeds to step S22. Once the operation proceeds to step S22, the control is switched to the high-speed drive control mode. If, on the other hand, the rotating speed of the horizontal shaft 3 is equal to or lower than the predetermined speed, the operation proceeds to step S24 to select the low-speed drive control mode. In short, one of the high-speed drive control mode and the low-speed drive control mode is selected depending upon the rotating speed of the horizontal shaft 3, i.e., the rotating speed of the telescope unit 13.

Next, an explanation is given on the operation performed by the drive control circuit in the surveying instrument in the embodiment of the present invention when rotating the telescope unit 13 along the vertical direction by a specific angle, such as 15° 20' 40", from the initial position (orientation).

In the first PWM generating device 103 shown in FIG. 3, the initial settings for the frequency f1 (a first frequency) and the duty cycle d1 of the PWM pulse are respectively 10 KHz and 99%. As the switch 108 is switched to the TA side, the high-speed drive control loop is formed. The pulse width of the PWM pulse corresponding to the frequency f1=10 KHz and the duty cycle d1=99% is approximately 0.1 msec.

The CPU 101 calculates the rotating speed and the rotational angle of the telescope unit 13 based upon the detection signals output by the surveying instrument encoder 106. Since the specified position is 15°20'40", the PWM generating device 103 adjusts the duty cycle d1 by controlling the up/down counter 102 so as to achieve a steady rotating speed until the rotational angle of the telescope unit 13 reaches a predetermined angle, such as 13°. Once the rotational angle of the telescope unit 13 exceeds 13°, the CPU 101 outputs an instruction (a PWM control signal) which will gradually lower the duty cycle d1 to 10% to the PWM generating device 103, thereby reducing the rotating speed of the telescope unit 13. Once the telescope unit 13 has rotated by a predetermined angle, such as 15°, relative to its initial position, the CPU 101 switches the switch 108 to the TB side.

Immediately after the switch 108 is switched to the TB side, the telescope unit 13 is still rotating due to inertia. The CPU 101 executes the goniometric interpolation calculation based upon the detection signals output from the surveying instrument encoder 106 over specific time intervals to ascertain the rotational angle and the rotating speed of the telescope unit 13. Once the CPU 101 judges that the telescope unit 13 has virtually come to a halt based upon the rotational angle and the rotating speed thus calculated, the CPU 101 implements control on the second PWM generating device 107 so as to output a PWM pulse (a second drive signal with the frequency f2=3 Hz and the duty cycle d2=0.3%) to the motor driver 104. The pulse width calculated in conformance to the frequency f2=3 Hz and the duty cycle d2=0.3% under these circumstances is 1 msec. This sets the pulse width of the drive voltage pulse supplied from the motor driver 104 to the motor 105 to 1 msec as well. In other words, the length of the voltage application to the motor 105 per drive voltage pulse cycle is 1 msec.

Once the voltage application to the motor 105 is completed, the CPU 101 calculates the rotational angle of the horizontal shaft 3, i.e., the rotational angle of the telescope unit 13, through the goniometric interpolation calculation based upon the detection signals output from the surveying instrument encoder 106. The length of time required to execute the calculation process is 50 msec at the most.

Since the frequency f2 of the PWM pulse output by the second PWM generating device 107 is 3 Hz, the length of time elapsing after the first voltage application until the subsequent voltage application is approximately 330 msec. Thus, it is possible to change the duty cycle for the PWM pulse to be output next based upon the rotational angle obtained through the goniometric interpolation calculation before the second PWM generating device 107 outputs the next PWM pulse.

By repeatedly executing the rotational angle measurement and the duty cycle change over a plurality of times as described above, the surveying optical system can be driven to achieve the target rotational angle with an accuracy rate of ±1 sec relative to the target setting.

It is to be noted that while the low-speed drive control mode is set by switching the switch 108 to the TB side when the rotating speed of the telescope unit 13 becomes equal to or less than a predetermined value in the embodiment of the present invention explained above, the control circuit may be switched differently from this. For instance, the switch 108 may be switched to the TB side at the point in time at which the telescope unit 13 is determined to have virtually come to a halt (come to a virtual stop), or the low-speed drive control mode may be set when a predetermined length of time has elapsed after switching the switch to the B side.

What is claimed is:

1. A surveying instrument comprising:
   a surveying optical system to be oriented toward a surveying target;
   a drive motor that drives said surveying optical system;
   a first drive control circuit that outputs a first drive signal having a first frequency and a first pulse duty cycle and used to continuously drive said drive motor;
   a second drive control circuit that outputs a second drive signal having a second frequency and a second pulse duty cycle and used to drive said drive motor so as to allow said drive motor to alternate accelerations and a virtual stop; and
   a control device that rotationally drives said surveying optical system to set said surveying optical system at a predetermined position by first providing said first drive signal to said drive motor to drive said drive motor and then providing said second drive signal to said drive motor to drive said drive motor.

2. A surveying instrument according to claim 1, further comprising:
   an encoder circuit that outputs a signal corresponding to an extent to which said surveying optical system is driven;
   a goniometric calculation circuit that performs goniometric calculation by using the signal output by said encoder circuit to determine a rotational angle of said surveying optical system; and
   an interpolation calculation circuit that performs interpolation calculation of the rotational angle by using the signal output by said encoder circuit to determine a rotational interpolation angle, wherein:
      said second drive control circuit changes at least one of the second pulse duty cycle and the second frequency of said second drive signal based upon the rotational angle and rotational interpolation angle determined by said goniometric calculation circuit and said interpolation calculation circuit.

3. A surveying instrument according to claim 2, wherein:
   said goniometric calculation circuit and said interpolation calculation circuit perform the goniometric calculation and the interpolation calculation after said second drive control circuit first outputs said second drive signal to said drive motor and said drive motor thus rotationally driven virtually comes to a halt; and
   said second drive control circuit next outputs said second drive signal which reflects the rotational angle and rotational interpolation angle determined by said goniometric calculation circuit and said interpolation calculation circuit.

4. A surveying instrument according to claim 1, wherein:
   the second frequency of said second drive signal is lower than the first frequency of said first drive signal, and a second pulse width based upon the second frequency and the second pulse duty cycle is larger than a first pulse width based upon the first frequency and the first pulse duty cycle.

5. A surveying instrument according to claim 4, wherein:
   said second drive control circuit sets the second frequency of said second drive signal within a 1 Hz~20 Hz range and also ensures that the second pulse width is within a 100 μsec~20 msec range.

6. A surveying instrument according to claim 4, further comprising:
   an encoder circuit that outputs a signal corresponding to an extent to which said surveying optical system is driven;
   a goniometric calculation circuit that performs goniometric calculation by using the signal output by said encoder circuit to determined a rotational angle of said surveying optical system; and
   an interpolation calculation circuit that performs an interpolation calculation of the rotational angle by using the signal output by said encoder circuit to determine a rotational interpolation angle, wherein:
      said first drive control circuit changes at least the first pulse duty cycle of said first drive signal based upon the rotational angle determined by said goniometric calculation circuit; and
      said second drive control circuit changes one of the second pulse duty cycle and the second frequency of said second drive signal based upon the rotational angle and rotational interpolation angle determined by said goniometric calculation circuit and said interpolation calculation circuit.

7. A surveying instrument according to claim 2, wherein:
   said control device selects one of said first drive signal and said second drive signal to be provided to said drive motor in correspondence to the rotational angle calculated by said goniometric calculation circuit.

8. A surveying instrument according to claim 1, further comprising:
   a speed detection device that detects a speed with which said surveying optical system is given, wherein:
      said control device provides said first drive signal to said drive motor if the drive speed detected by said speed detection device exceeds a predetermined value and provides said second drive signal to said drive motor if the speed detected by said speed detection device is equal to or lower than the predetermined value.

9. A surveying instrument comprising:
   a surveying optical system to be oriented toward a surveying target;
   a drive motor that drives said surveying optical system;
   a first drive control circuit that implements drive control on said drive motor at a first drive speed by outputting a first drive signal having a first frequency and a first pulse width;
   a second drive control circuit that implements drive control on said drive motor at a second drive speed lower than the first drive speed by outputting a second drive signal having a second frequency lower than the first frequency and a second pulse width larger than the first pulse width; and
   a control device that provides one of said first drive signal and said second drive signal to said drive motor.

10. A surveying instrument according to claim 9, further comprising:
    an encoder circuit that outputs a signal corresponding to an extent to which said surveying optical system is driven;
    a goniometric calculation circuit that performs goniometric calculation by using the signal output by said encoder circuit to determine a rotational angle of said surveying optical system and an interpolation calculation circuit that performs interpolation calculation of the rotational angle by using the signal output by said encoder circuit to determine a rotational interpolation angle, wherein:
  said second drive control circuit changes at least one of the second frequency or the second pulse width based upon the rotational angle and rotational interpolation angle determined by said goniometric calculation circuit and said interpolation calculation circuit.

11. A surveying instrument according to claim 3, wherein:
said second drive signal output by said second drive control circuit before the goniometric calculation and the interpolation calculation are calculated is a single pulse.

12. A method for drive control of a surveying instrument, comprising:
  outputting a first drive signal so as to continuously drive a drive motor that rotationally drives a surveying optical system and outputting a second drive signal so as to drive the drive motor by allowing the drive motor to alternate accelerations and a virtual stop; and
  controlling a rotational drive of the surveying optical system so as to set the surveying optical system at a predetermined position by first providing the first drive signal to the drive motor and then providing the second drive signal to the drive motor.

13. A method for drive control of a surveying instrument according to claim 11, further comprising:
  detecting an extent to which the surveying optical system is driven;
  performing goniometric calculation and interpolation calculation by using the detected values of the extent to which the surveying optical system is driven to determine a rotational angle and rotational interpolation angle of the surveying optical system, after providing the second drive signal containing a single pulse to the drive motor thus rotationally driven; and
  providing the second drive signal which reflects the rotational angle and rotational interpolation angle determined by performing the goniometric calculation and the interpolation calculation to the drive motor.

14. A surveying instrument comprising:
  a surveying optical system to be oriented toward a surveying target;
  a drive motor that drives said surveying optical system;
  an encoder circuit that outputs a signal corresponding to an extent to which said surveying optical system is driven;
  a goniometric calculation circuit that performs goniometric calculation by using the signal output by said encoder circuit to determine a rotational angle of said surveying optical system;
  an interpolation calculation circuit that performs interpolation calculation of the rotational angle by using the signal output by said encoder circuit to determine a rotational optical angle;
  a first drive control circuit that outputs a first drive signal having a first frequency and a first pulse duty cycle and used to continuously drive said drive motor;
  a second drive control circuit that outputs a second drive signal having a second frequency lower than the first frequency of said first drive signal and a second pulse duty cycle with a second pulse width based upon the second frequency and the second pulse duty cycle, larger than the first pulse width based upon the first frequency and the first pulse duty cycle, so as to drive said drive motor by allowing said drive motor to alternate accelerations and a virtual stop; and
  a control device that rotationally drives said surveying optical system to set said surveying optical system at a predetermined position by first providing said first drive signal to said drive motor to drive said drive motor and then providing said second drive signal to said drive motor to drive said drive motor, wherein;
    said second drive control circuit changes at least one of the second pulse duty cycle and the second frequency of said second drive signal based upon the rotational angle and rotational interpolation angle determined by said goniometric calculation circuit and said interpolation calculation circuit.

* * * * *